(12) United States Patent
Tanaka et al.

(10) Patent No.: US 6,236,137 B1
(45) Date of Patent: *May 22, 2001

(54) COMMUTATOR MOTOR (75) Inventors: Toshinori Tanaka; Kyouhei Yamamoto; Akihiro Daikoku; Akihiko Imagi; Yoshio Yoshikuwa, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/369,418

(22) Filed: Aug. 6, 1999

(30) Foreign Application Priority Data

Aug. 10, 1998 (JP) .................................................. 10-226317

(51) Int. Cl.[7] ............................. H02K 39/08; H02K 3/04
(52) U.S. Cl. ......................... 310/233; 310/234; 310/204; 310/206
(58) Field of Search .................................. 310/231, 232, 310/233, 234, 235, 236, 237, DIG. 6, 204, 206

(56) References Cited

U.S. PATENT DOCUMENTS

| 3,535,776 | * | 10/1970 | Luca | 29/597 |
| 4,396,850 | * | 8/1983 | Herr | 310/239 |
| 4,490,637 | * | 12/1984 | Van De Griend | 310/237 |
| 6,057,623 | * | 5/2000 | Tanka et al. | 310/206 |
| 6,057,626 | * | 5/2000 | Tanaka et al. | 310/233 |

FOREIGN PATENT DOCUMENTS

| 56-149565 | 4/1955 | (JP) . |
| 59-86847 | 6/1984 | (JP) . |
| 1-120767 | 8/1989 | (JP) . |

* cited by examiner

*Primary Examiner*—Nestor Ramirez
*Assistant Examiner*—Dang Dinh Le
(74) *Attorney, Agent, or Firm*—Sughrue, Mion, Zinn, Macpeak & Seas, PLLC

(57) ABSTRACT

A commutator motor comprises a yoke, a magnetic field portion secured to the inner wall of the yoke, a shaft disposed within the yoke so as to be able to rotate freely, an armature secured to the shaft having windings constructed by winding wire by a lap-winding method into slots formed on the outer circumferential surface of a core, a commutator including a resin portion and a plurality of segments held on an outer circumferential portion of the insulating resin portion with the spaces between adjacent segments being held by the insulating resin portion, a plurality of brushes contacting the surface of the commutator, and terminals electrically connecting segments which are to have the same electric potential.

5 Claims, 15 Drawing Sheets

● 100% OF THE CURRENT PERPENDICULAR AWAY FROM THE FIGURE
⊙ 100% OF THE CURRENT PERPENDICULAR FORWARDS THE FIGURE
◎ ZERO OF THE CURRENT
⊕ 0~100% OF THE CURRENT PERPENDICULAR FORWARDS THE FIGURE
◆ 0~100% OF THE CURRENT PERPENDICULAR AWAY FROM THE FIGURE

COMMUTATOR MOTOR

BACKGROUND OF THE INVENTION

1. Field of the Invention

The present invention relates to a commutator motor comprising a commutator having a hollow cylindrical insulating resin portion and a plurality of segments on an outer circumferential portion of the insulating resin portion with the spaces between each being held by the insulating resin portion.

2. Description of the Related Art

Figure 16:
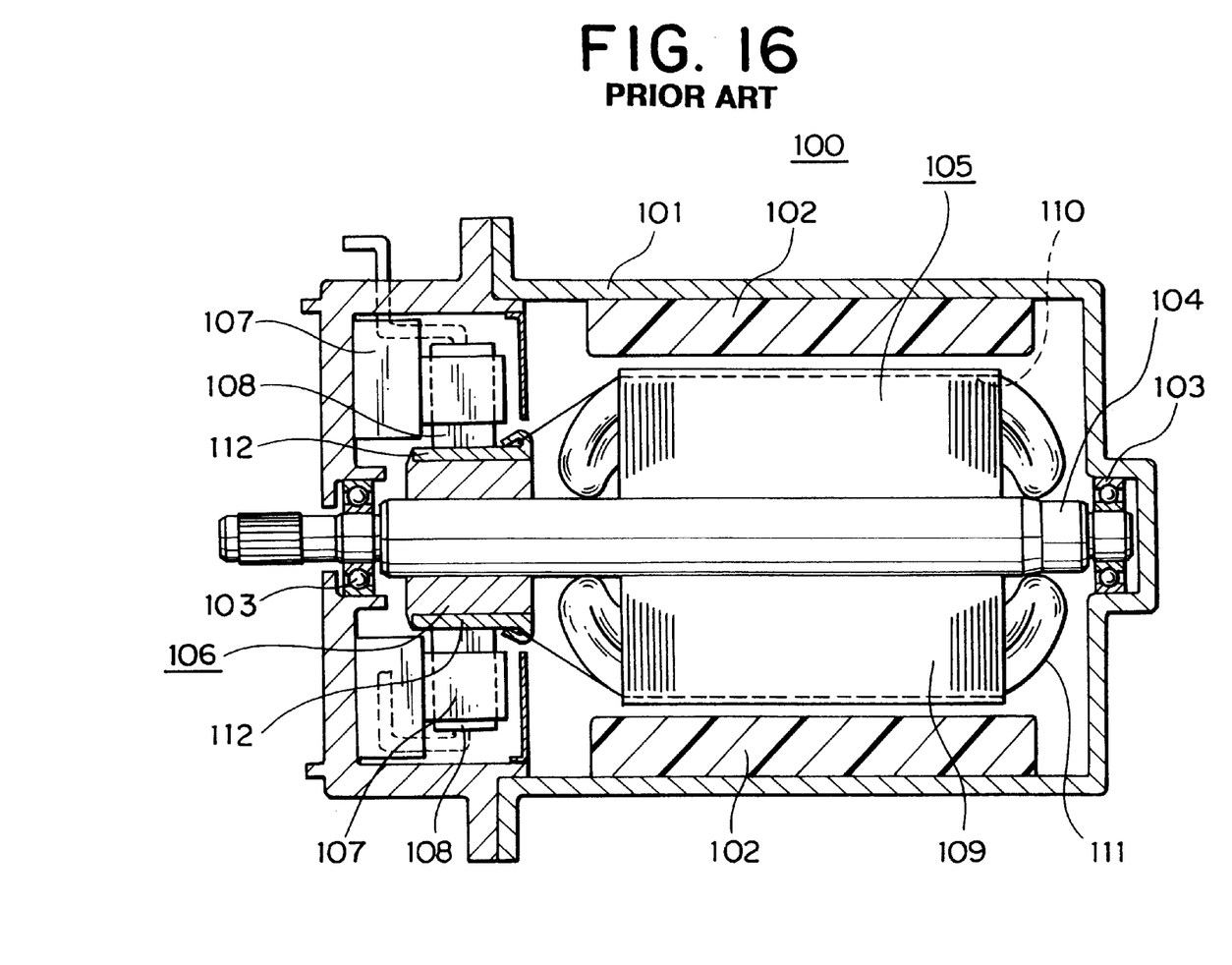
FIG. 16 is a cross-section of a conventional commutator motor.

FIG. 16 is a cross-section of a conventional commutator motor 100. The commutator motor 100 comprises: a cylindrical yoke 101; permanent field magnets 102 secured inside the yoke 101; a shaft 104 disposed inside the yoke 101 by means of bearings 103 so as to be able to rotate freely; an armature 105 secured to the shaft 104; a commutator 106 secured to an end portion of the shaft 104; and brushes 108 held by brush holders 107 contacting the surface of the commutator 106 by the elastic force of springs (not shown).

The armature 105 comprises: a core 109 having a plurality of slots 110 extending longitudinally; and windings 111 constructed by winding wire into the slots 110 by a lap winding method.

The above hollow, cylindrical commutator 106 is provided with a plurality of copper segments 112 arranged with even pitch, and mica (not shown) disposed between the segments 112 for electrically insulating adjacent segments 112.

In the above 4-pole lap-wound commutator motor 100, an electric current is supplied to the windings 111 from outside by means of the brushes 108 contacting the segments 112, whereby the armature 105 rotates together with the shaft 104 due to electromagnetic action.

In a commutator motor 100 of the first construction above, mica is interposed between the segments 112, forcing the commutator motor 100 to be enlarged. For that reason, there are commutator motors aiming to reduce size by eliminating the mica.

Figure 17:
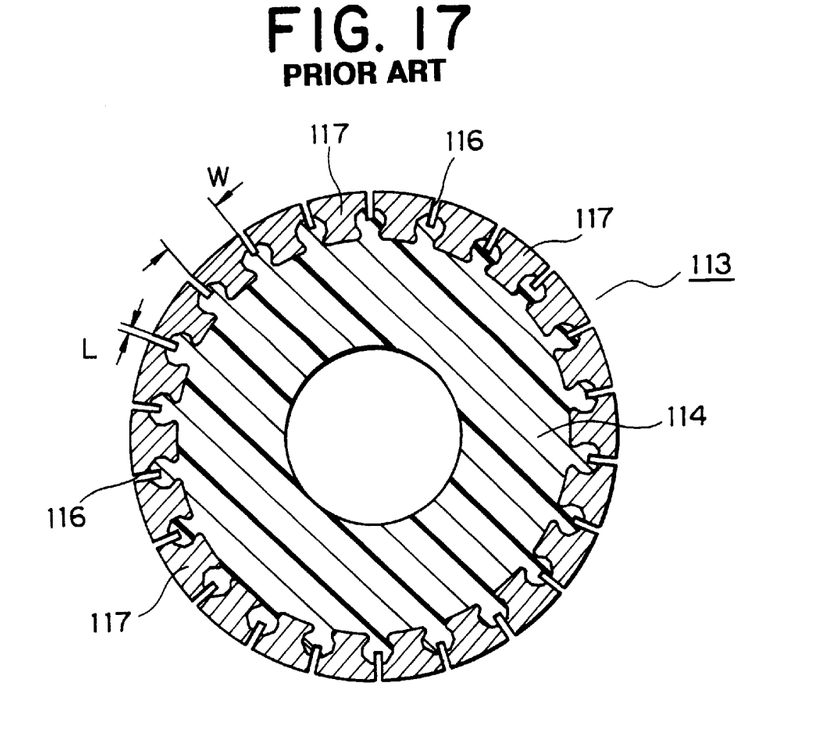
FIG. 17 is a front cross-section of another example of a conventional commutator motor.
Figure 18:
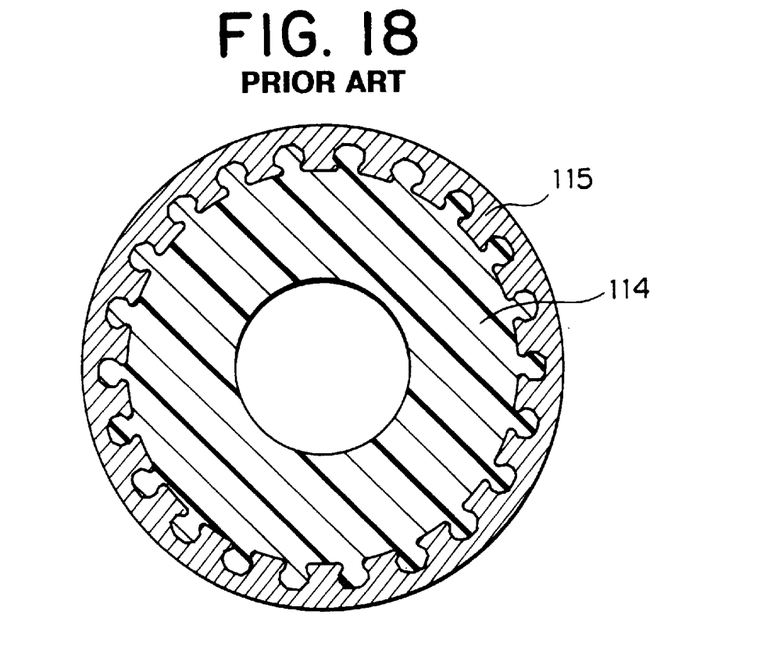
FIG. 18 is a front cross-section of the commutator in FIG. 17 during manufacture.

FIG. 17 is a front cross-section of a commutator motor 113 of a commutator motor of a second construction. As shown in FIG. 18, the commutator 113 is formed by integrating an insulating resin portion 114 and an annular portion 115 composed of copper by insertion molding, then cutting a plurality of spaces 116 longitudinally in the outer surface of the annular portion 115. In other words, the commutator 113 is formed such that spaces 116 are formed between the segments 117 and the segments 117 are arranged with even pitch circumferentially.

Figure 19:
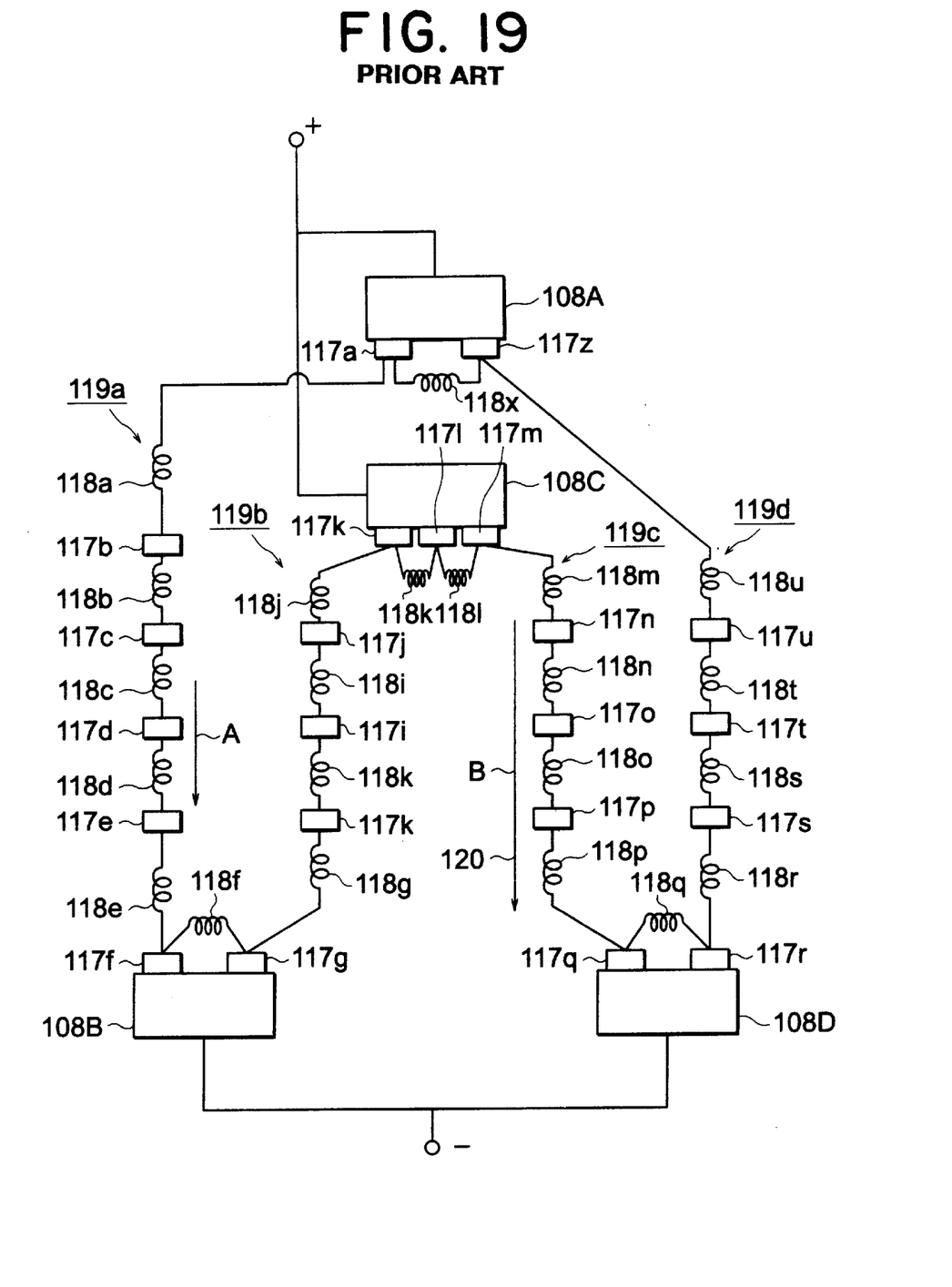
FIG. 19 is an electrical circuit diagram of a commutator motor using the commutator in FIG. 17.

In a commutator motor of the second construction above, all of the segments 117 of the commutator 113 are held by the insulating resin portion 114, but when the cutting precision is insufficient, irregularities occur in the width W of the segments 117 and in the dimensions L of the spaces between the segments 117. Then, as shown in FIG. 19, for example, where three segments 117 should normally contact the first brush 108A and the third brush 108C and two segments 117 should normally contact the second brush 108B and the fourth brush 108D, for just an instant only two segments 117a, 117x (the first and twenty-second) contact the first brush 108A. As a result, where the number of coils 118 in this case should normally be evenly distributed at four for each of the first to fourth circuits 119a to 119d between the first to fourth brushes 108A to 108D, a different number arises. That is to say, the first coil 118a to the fifth coil 118e are interposed in the first circuit 119a, making five interposed coils 118. Consequently, where the current A flowing through the first circuit 119a should normally have the same value as the current B flowing through the third circuit 119c, a different value arises. As a result, a problem has been that the balance of electromagnetic attraction acting on the armature 105 is lost, giving rise to excitation in the armature 105 and generating operating noise.

Figure 20:
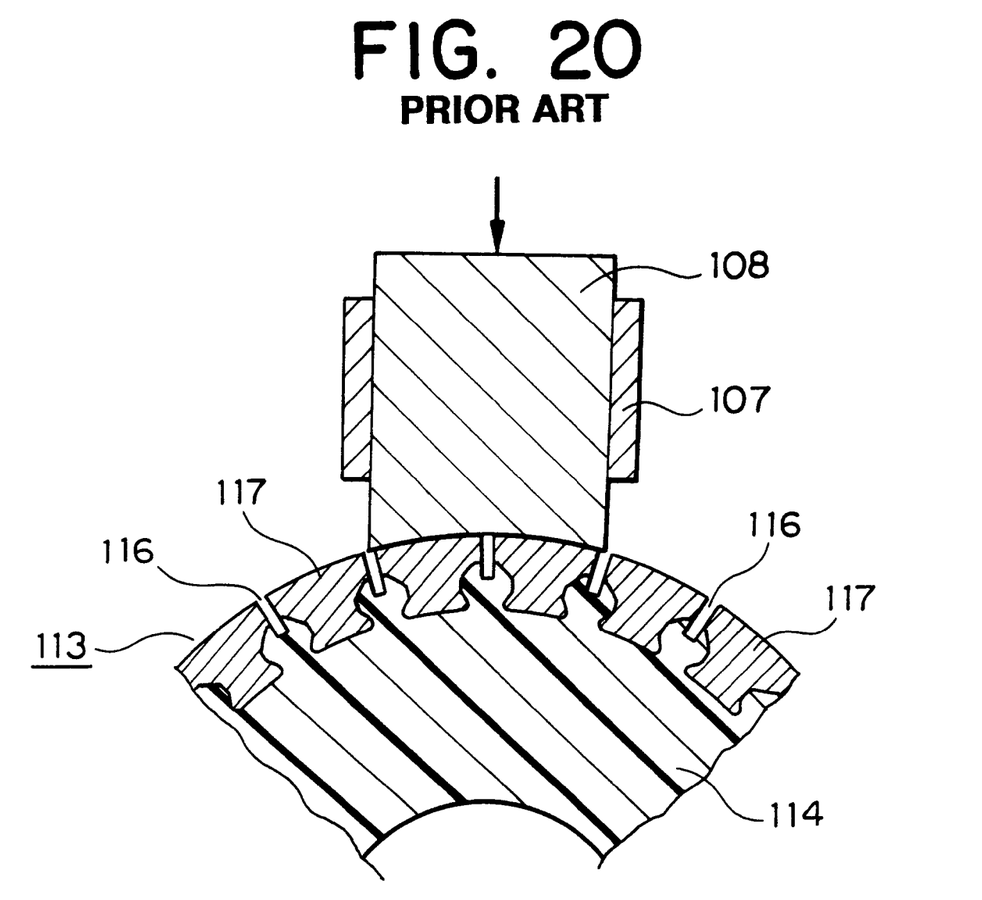
FIG. 20 is a diagram showing the state of contact between a brush and segments when the commutator in FIG. 17 is used.

Besides requiring highly precise cutting of the annular portion 115 in order to avoid problems of deviation in the commutation timing resulting from the above sort of irregularities in cutting precision, as shown in FIG. 20, in order to prevent the brushes 108 from shifting around the circumference of the commutator 113, the clearance between the brushes 108 and the brush holders 107 is made as small as possible, and for that reason friction arises between the brushes 108 and the brush holders 107, and so a problem has been that in order to overcome that frictional force and place the brushes 108 in contact with the segments 117, the force pressing against the brushes 108 must be large, increasing torque loss.

SUMMARY OF THE INVENTION

The present invention aims to solve the above problems and an object of the present invention is to provide a commutator motor enabling reductions in operating noise, as well as reducing the force pressing on the brushes and reducing torque loss.

To this end, according to the present invention, there is provided a commutator motor comprising: a yoke; a magnetic field portion secured to the inner wall of the yoke; a shaft disposed within the yoke so as to be able to rotate freely; an armature secured to the shaft having windings constructed by winding wire by a lap-winding method into slots formed on the outer circumferential surface of a core so as to extend longitudinally; a commutator secured to the shaft including a hollow cylindrical insulating resin portion and a plurality of segments held on an outer circumferential portion of the insulating resin portion with spaces between adjacent segments being held by the insulating resin portion; a plurality of brushes contacting the surface of the commutator; and a equalizing member electrically connecting segments which are to have the same electric potential.

DETAILED DESCRIPTION OF THE PREFERRED EMBODIMENTS

Embodiment 1

Figure 1:
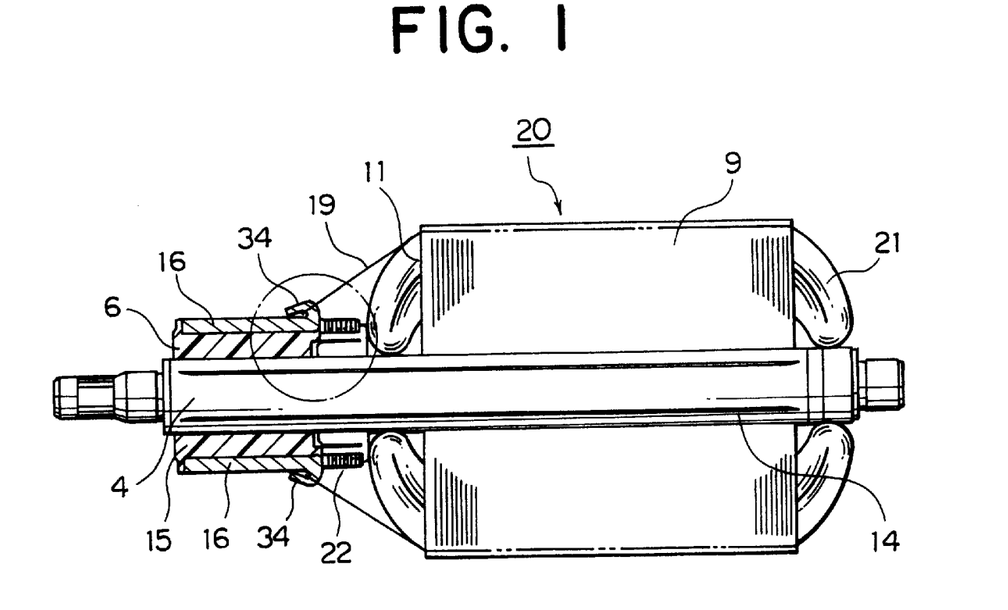
FIG. 1 is a cross-section of the interior of a commutator motor according to Embodiment 1 of the present invention.
Figure 2:
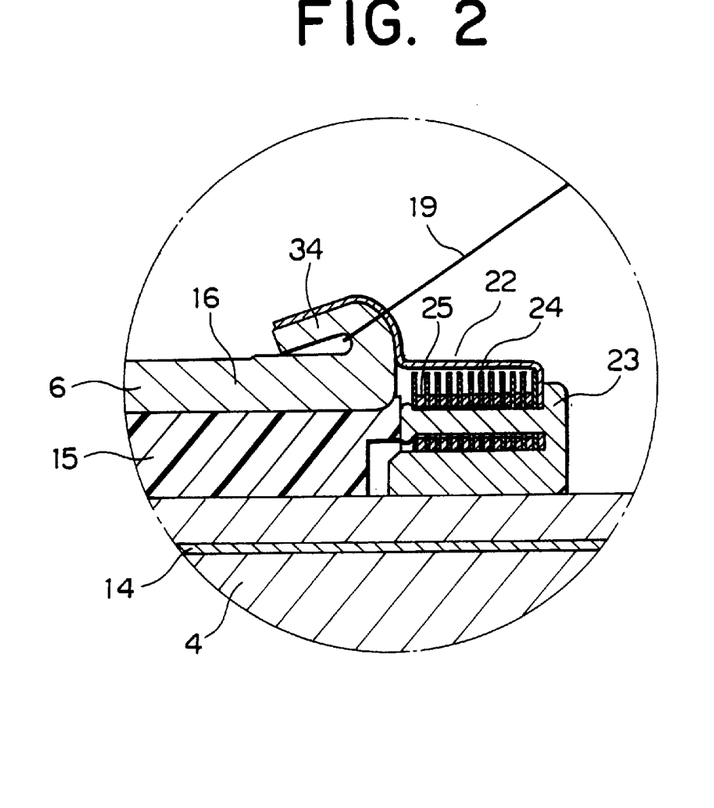
FIG. 2 is a partial enlargement of FIG. 1.

FIG. 1 is a cross-section of the internal construction of a commutator motor according to Embodiment 1 of the present invention, and FIG. 2 is an enlargement of part of FIG. 1. The commutator motor comprises: a cylindrical yoke (not shown); four permanent magnets (not shown) composed of ferrite spaced circumferentially and secured inside the yoke; a shaft 4 disposed inside the yoke by means of bearings (not shown) so as to be able to rotate freely; an armature 20 secured to the shaft 4; a commutator 6 comprising a plurality of segments 16 secured to an end portion of the shaft 4; four brushes (not shown) spaced equidistantly and placed in contact with the surface of the commutator 6 by the elastic force of springs (not shown); and arn equalizer main body 22 secured to the shaft 4 between the armature 20 and the commutator 6.

The armature 20 comprises: a core 9 having twenty-four slots 11 extending in the axial direction; and a winding 21 constructed by winding wire 19 being enamel-coated, round copper wire into the slots 11 by a lap winding method.

The commutator 6 comprises a hollow, cylindrical insulating resin portion 15 composed of phenol resin, and a plurality of copper segments 16 disposed with even pitch circumferentially around the outer surface of the insulating resin portion 15. Moreover, spaces 75 (see FIG. 8) are formed between adjacent segments 16 to insulate the segments 16 from each other, the spaces 75 between the segments 16 being maintained by the insulating resin portion 15 supporting the segments 16.

Figures 3A, 3B:
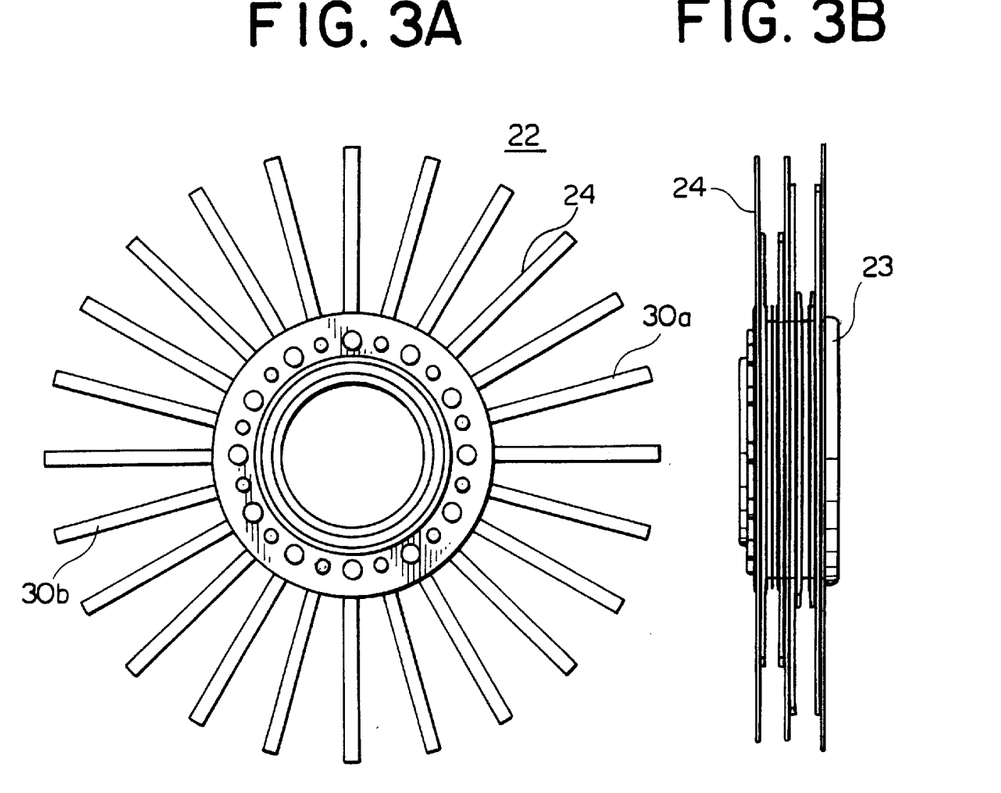
FIG. 3A is a developed front elevation of the equalizer main body in FIG. 1.
FIG. 3B is a side elevation of FIG. 3A.

FIG. 3A is a developed front elevation of the equalizer main body 22, and FIG. 3B is a side elevation of the equalizer main body 22 in FIG. 3A. The equalizer main body 22 comprises: twelve terminals 24 composed of copper plate, etc., which are equalizing members; and twelve insulating plates 25, alternately stacked in layers on a base 23.

Figure 4A:
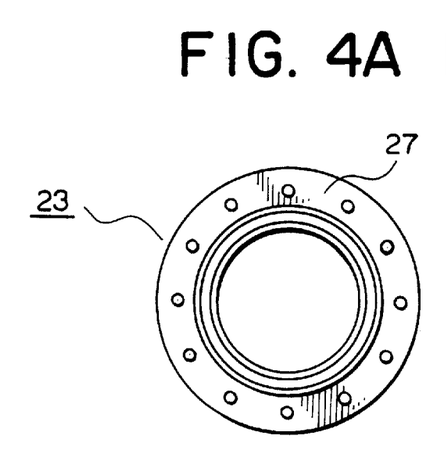
FIG. 4A is front elevation of the base of the equalizer main body in FIG. 1.
Figure 4B:
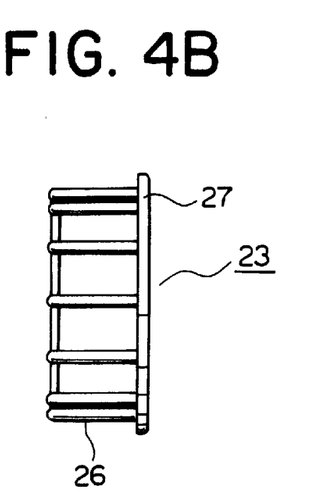
FIG. 4B is a side elevation of FIG. 4A.

FIGS. 4A and 4B are a front elevation and a side elevation, respectively, of the base 23. Twelve pins 26 are arranged so as to stand equidistantly around the circumference of a toric base main body 27.

Figure 5:
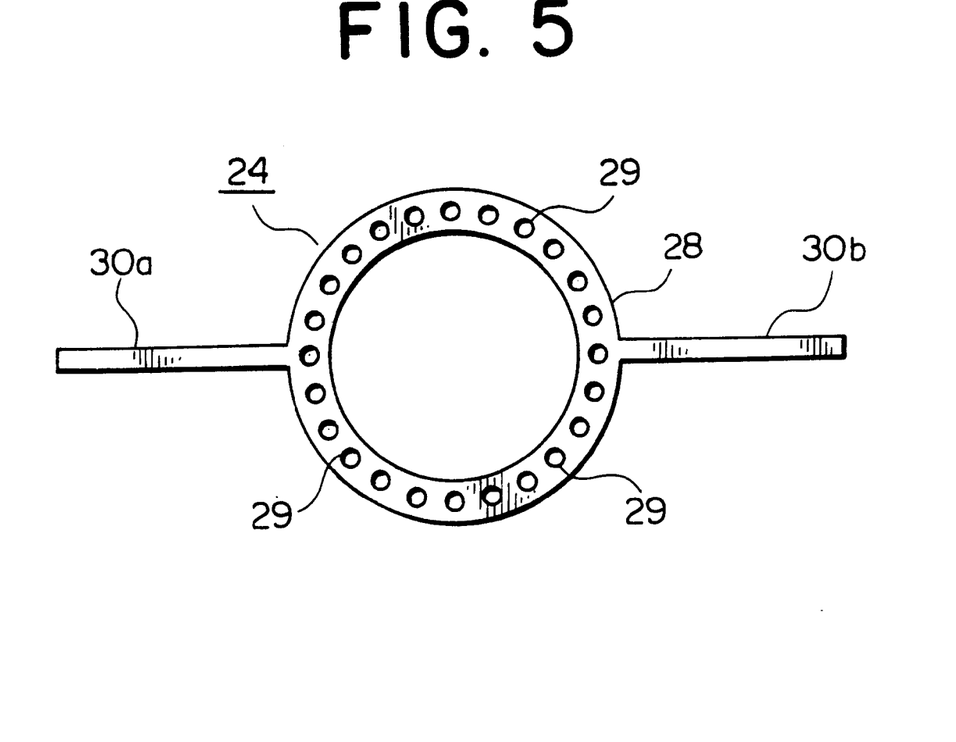
FIG. 5 is a front elevation of a terminal from the equalizer main body in FIG. 1.

FIG. 5 is a front elevation of a terminal 24 being an equalizing member. Apertures 29 are formed at 24 points spaced equidistantly around the circumference of the annular terminal main body 28 of each of the terminals 24 being equalizing members. Furthermore, equalizer lead portions 30a, 30b extending radially outwards in opposite directions are disposed on the terminal main body 28.

Figure 6:
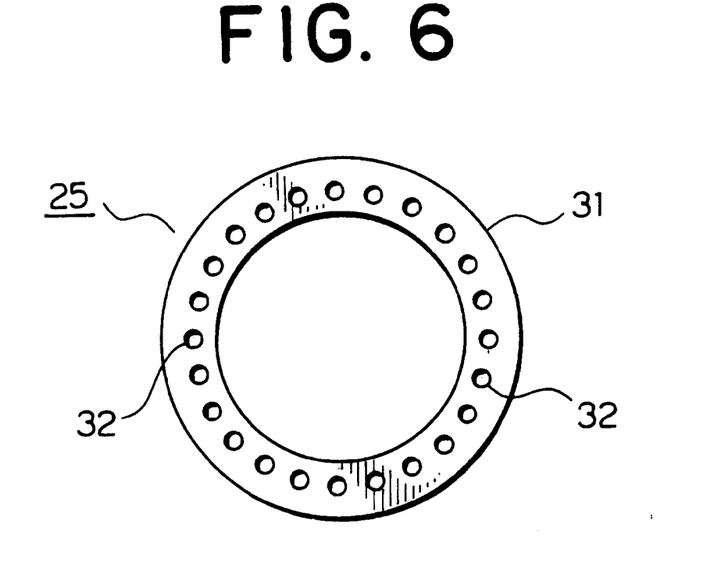
FIG. 6 is a front elevation of an insulating plate from the equalizer main body in FIG. 1.

FIG. 6 is a front elevation of an insulating plate 25. Apertures 32 are formed at 24 points spaced equidistantly around the circumference of the annular insulating plate main body 31 of each of the insulating plates 25.

In the above commutator motor, the equalizer main body 22 is assembled by alternately stacking the twelve terminals 24 and the twelve insulating plates 25 on the base 23. During this process, each successive terminal 24 is rotated by 15 degrees and the terminals 24 are secured to the base 23 by passing the pins 26 of the base 23 through the apertures 29 in the terminals 24. Furthermore, the insulating plates 25 are secured to the base 23 by passing the pins 26 of the base 23 through the apertures 32 in the insulating plates 25. Then, the equalizer main body 22 is integrated by crimping the ends of the pins 26.

Next, the equalizer main body 22 and the commutator 6 are fitted onto the shaft 4 in that order. Moreover, protrusions 14 extending in the axial direction are formed on the shaft 4 in order to position the equalizer main body 22 and the commutator 6 relative to the direction of rotation, and the base 23 and the insulating resin portion 15, which are both composed of phenol resin, are secured to the protrusions 14 by elastic deformation.

Next, the armature 20 is formed by bending the equalizer lead portions 30a, 30b to align with hooks 34, and forming the windings 21 by winding the wire 19 onto the core 9 by a lap winding method, then the equalizer lead portions 30a, 30b and the hooks 34 are electrically connected at twenty-four points by simultaneous fusion or the like.

In a commutator motor of the above construction, segments 16 which are to have the same electric potential are electrically connected using the terminals 24 which are equalizing members, not only preventing circulating currents from flowing through the circuits into the brushes due to differences in induced voltage arising in each of the circuits of the windings 21 between the brushes, but also preventing imbalances in electromagnetic attraction from arising due to differences in the numbers of coils in each of the circuits.

Figure 7:
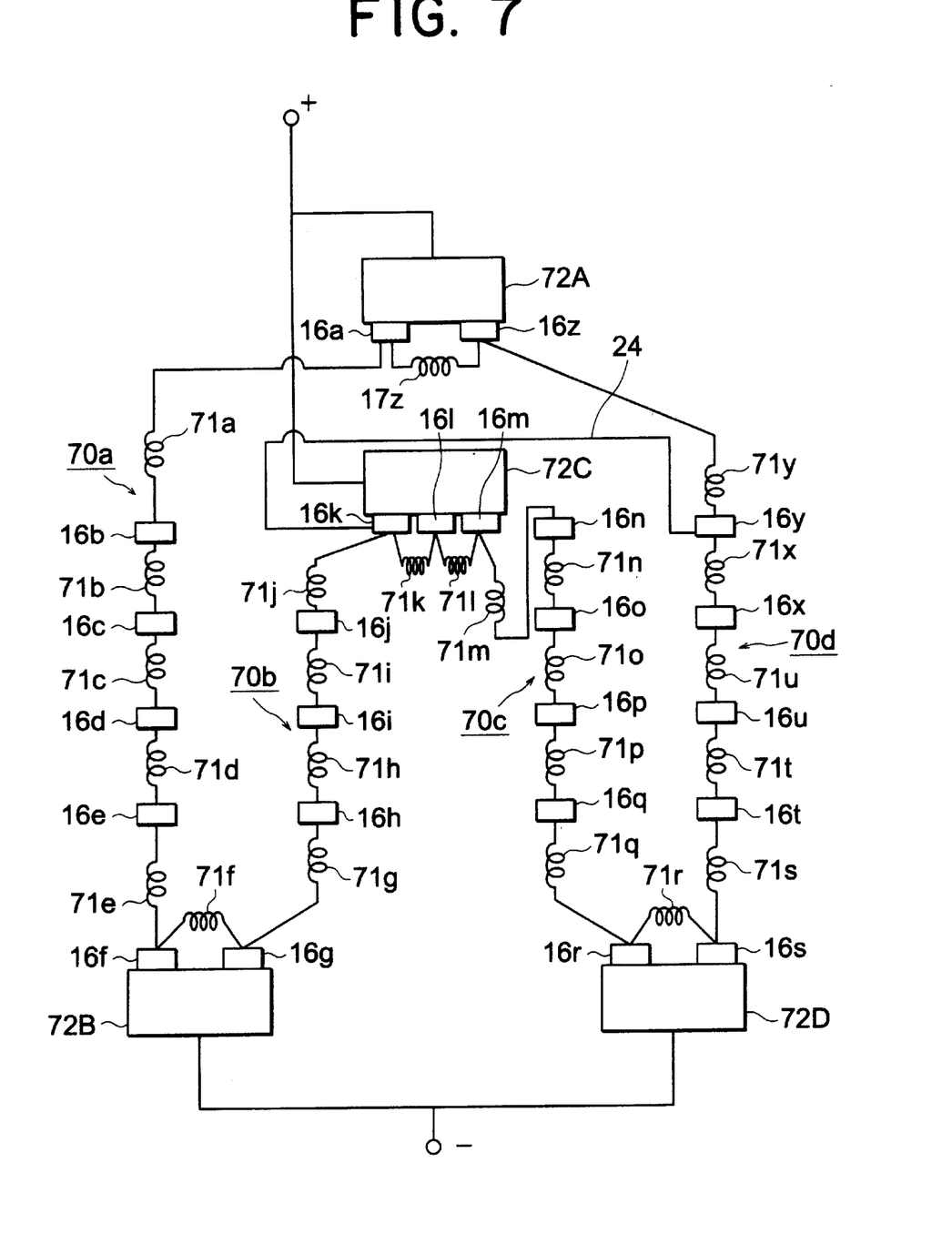
FIG. 7 is an electrical circuit diagram of the commutator motor in FIG. 1.

The details thereof will be explained below. FIG. 7 is an electrical circuit diagram of the armature 20 of the above commutator motor and shows how whereas two segments 16 should normally contact each of the brushes from the first brush 72A to the fourth brush 72D, for just an instant three segments 16k, 16l, 16m contact the third brush 72C.

Moreover, each of the following segments are electrically connected to each other by terminals 24 being equalizing members: the first segment 16a to the thirteenth segment 16m; the second segment 16b to the fourteenth segment 16n; the third segment 16c to the fifteenth segment 16o; the fourth segment 16d to the sixteenth segment 16p; the fifth segment 16e to the seventeenth segment 16q; the sixth segment 16f to the eighteenth segment 16r; the seventh segment 16g to the nineteenth segment 16s; the eighth segment 16h to the twentieth segment 16t; the ninth segment 16i to the twenty-first segment 16u; the tenth segment 16j to the twenty-second segment 16x; the eleventh segment 16k to the twenty-third segment 16y; and the twelfth segment 16l to the twenty-fourth segment 16z. However, in FIG. 7, all of the terminals 24 have been omitted except for the one electrically connecting the eleventh segment 16k to the twenty-third segment 16y.

In this case, normally there should be the same number of coils 71, namely five, in each of the first to fourth circuits 70a to 70d between the first to fourth brushes 72A to 72D, but there are four coils 71 interposed in the second circuit 70b, namely the seventh coil 71g to the tenth coil 71j. If there were no terminals 24, when the commutation timing deviated in this manner, imbalances in electromagnetic attraction would arise because the discrepancy between the number of coils 71 in the second circuit 70b and the number of coils 71 in the fourth circuit 70d would lead to differences in current value. However, because segments 16k and 16y are electrically connected by a terminal 24, the number of coils in the second circuit 70b and the number of coils 71 in the fourth circuit 70d are equal, and since the electromagnetic attraction is therefore balanced, excitation does not arise and operating noise is not generated.

Figure 8:
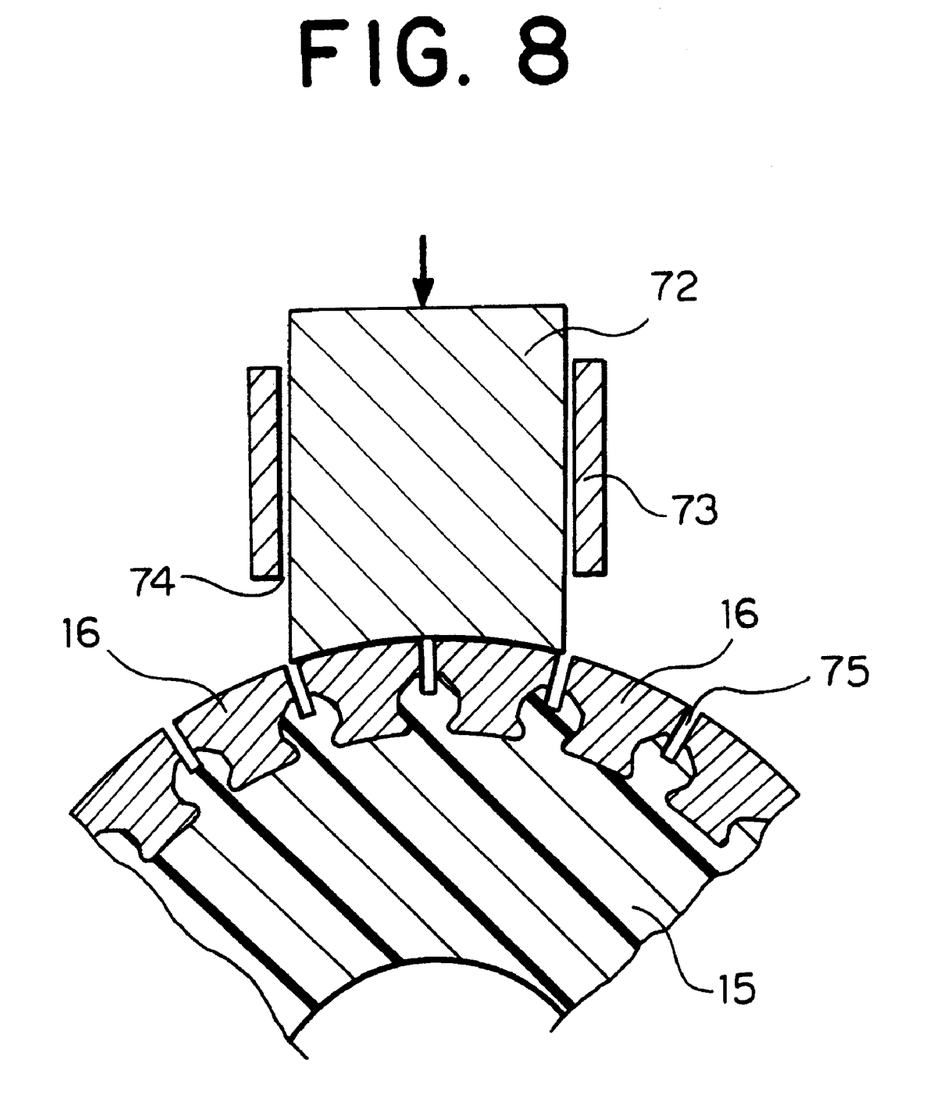
FIG. 8 is a diagram showing the state of contact between a brush and segments from FIG. 1.

Furthermore, because the terminals 24 can prevent the generation of operating noise from arising due to deviations in commutation timing, it is possible to make the clearance 74 between the brushes 72 and the brush holders 73 large, as shown in FIG. 8, making it possible to reduce the force pressing on the brushes accordingly, enabling torque loss to be reduced.

Figure 9:
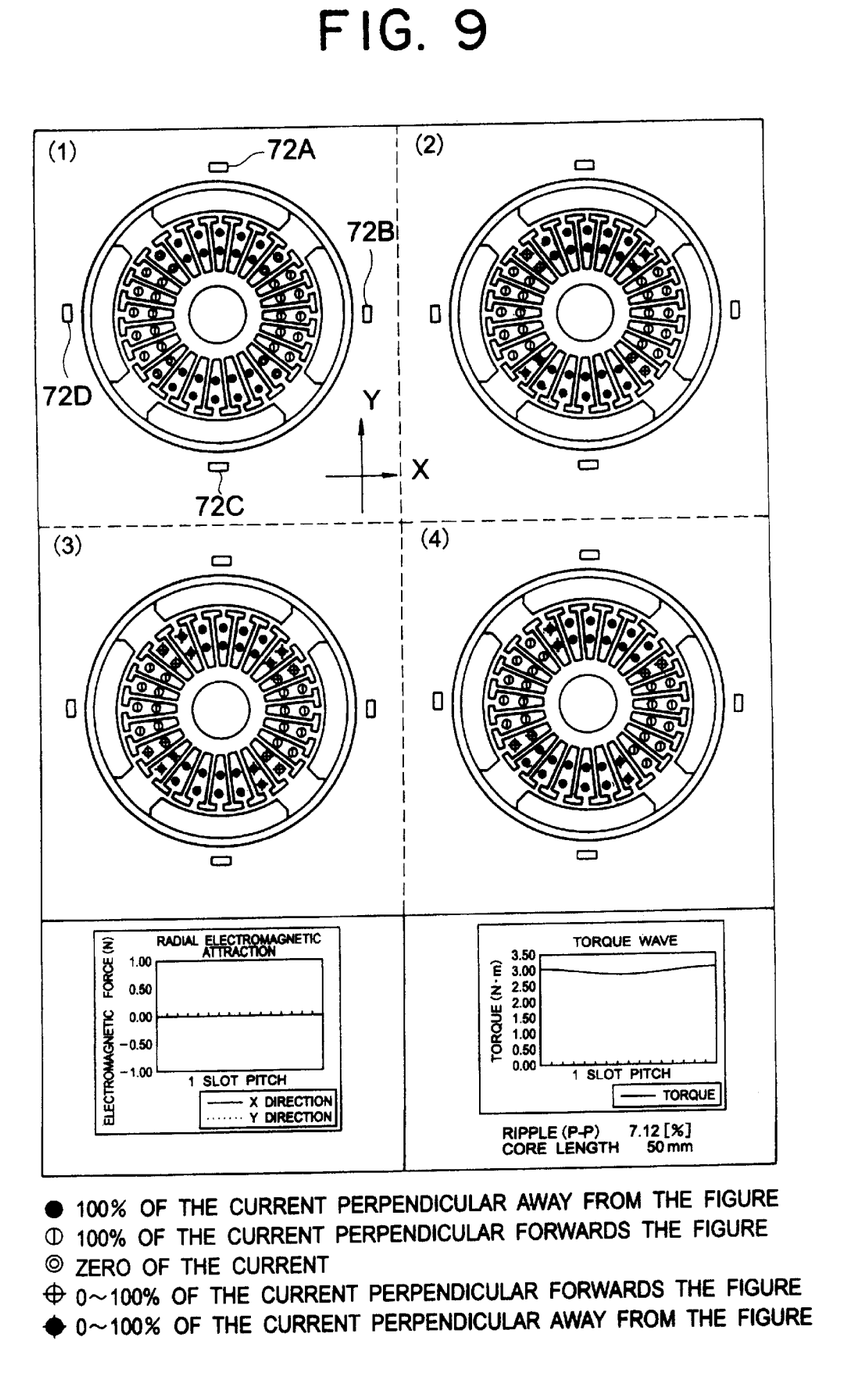
FIG. 9 is a set of diagrams and graphs explaining the electromagnetic attraction acting on an armature when there are four poles, lap windings, four brushes, and twenty-four slots.

Moreover, in a commutator motor of the above construction, a system having four magnetic poles, twenty-four slots 11, lap windings, and four brushes has been adopted. FIG. 9 is a set of diagrams and graphs explaining the electromagnetic attraction and torque ripples acting radially on the armature 20 in this case. Because the current in each of the circuits is balanced by the terminals, the force acting on the armature 20 is constantly zero.

Figure 10:
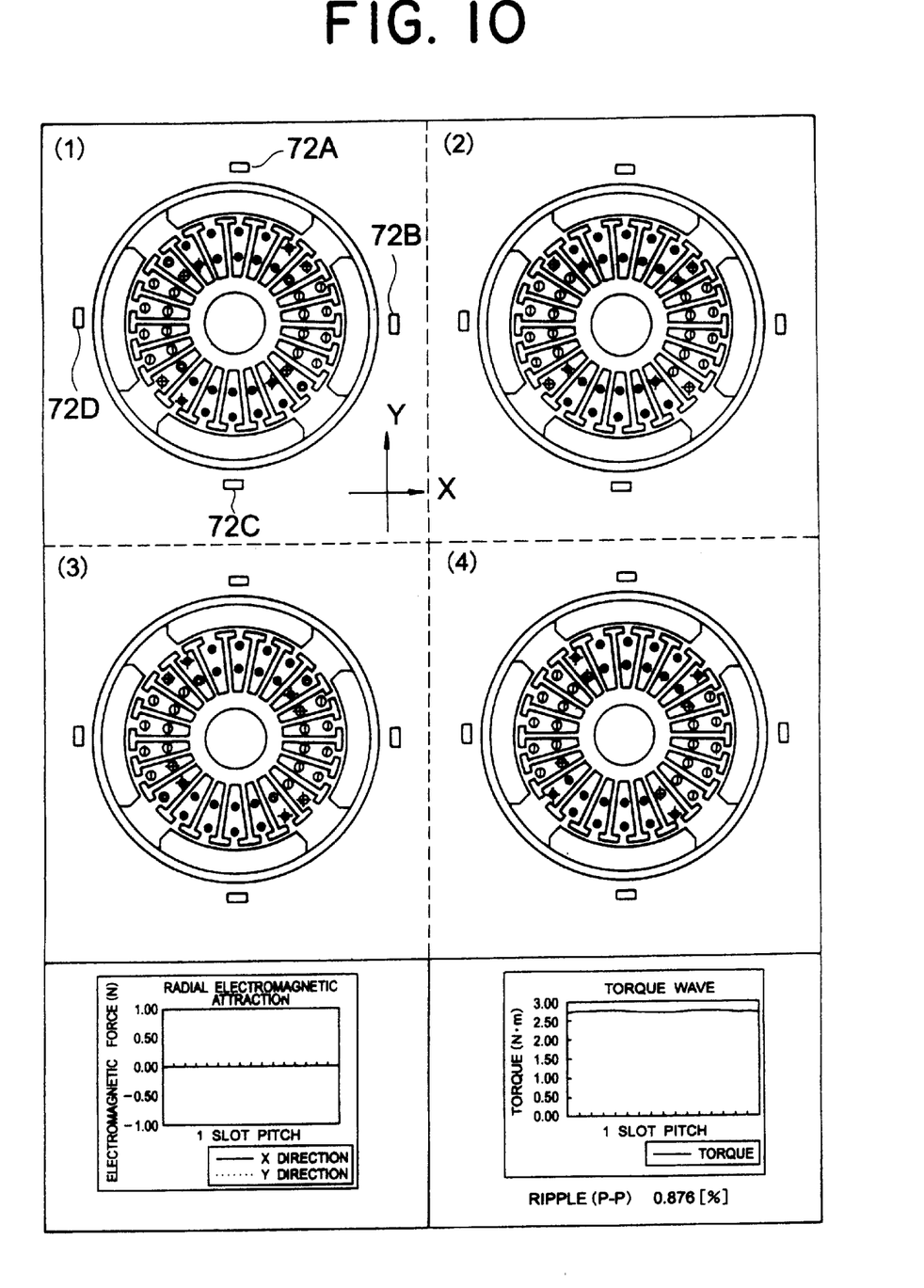
FIG. 10 is a set of diagrams and graphs explaining the electromagnetic attraction acting on an armature when there are four poles, lap windings, four brushes, and twenty-two slots.

Moreover, FIG. 10 is a set of diagrams and graphs explaining the electromagnetic attraction and torque ripples acting radially on an armature when there are four magnetic poles, twenty-two slots, lap windings, and four brushes. In this case, the force acting on the armature 20 is also constantly zero, and it can be seen that operating noise is not generated by attraction in this case. However, in this case, the value of the torque ripples⁻(p—p) compared to FIG. 9 is 7.12 percent to 0.876 percent, showing a large reduction in torque ripples.

Embodiment 2

Figure 11:
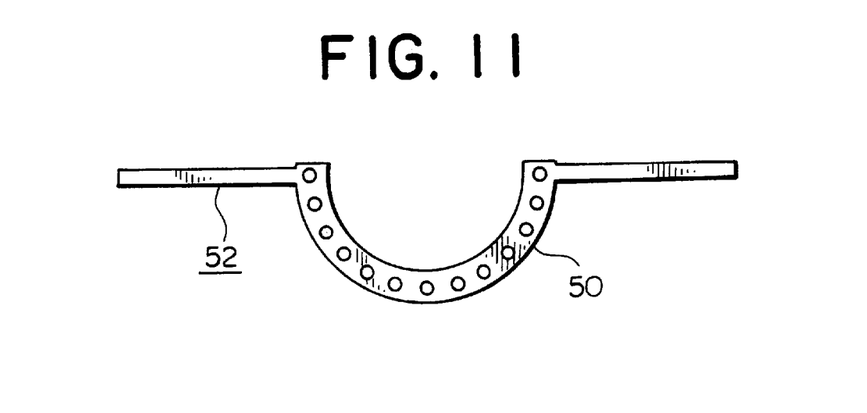
FIG. 11 is a front elevation of a terminal of a commutator motor according to Embodiment 2 of the present invention.

In the equalizer main body 22 of the above commutator motor an annular terminal main body was used, but in order to reduce the amount of copper material used, terminals 52 in a terminal main body 50 may be arc-shaped, as shown in FIG. 11.

Embodiment 3

Figure 12:
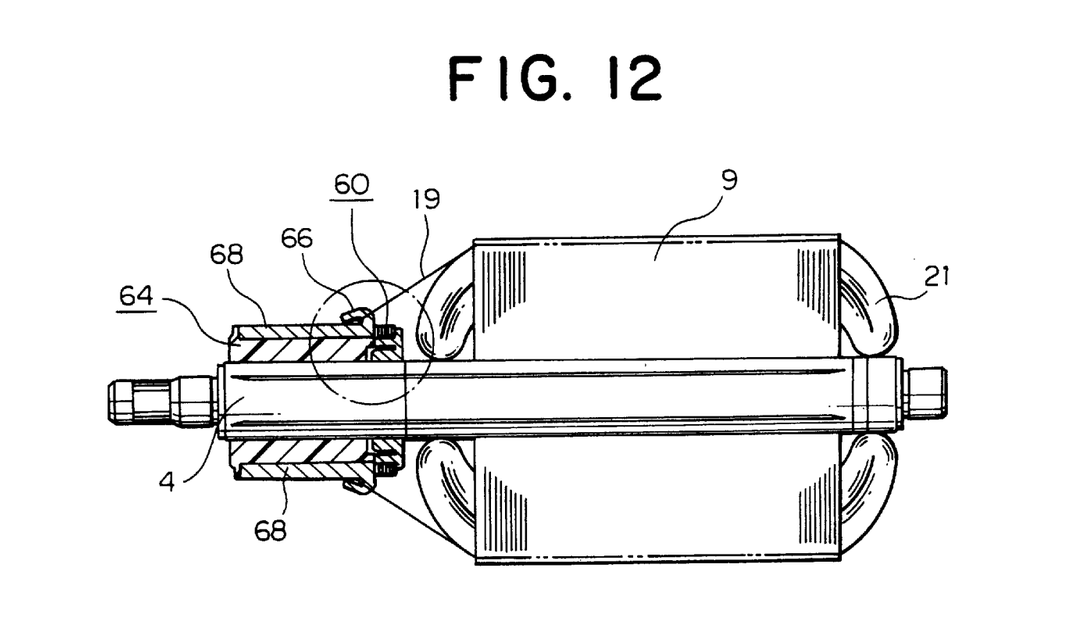
FIG. 12 is a cross-section of an armature of a commutator motor according to Embodiment 3 of the present invention.
Figure 13:
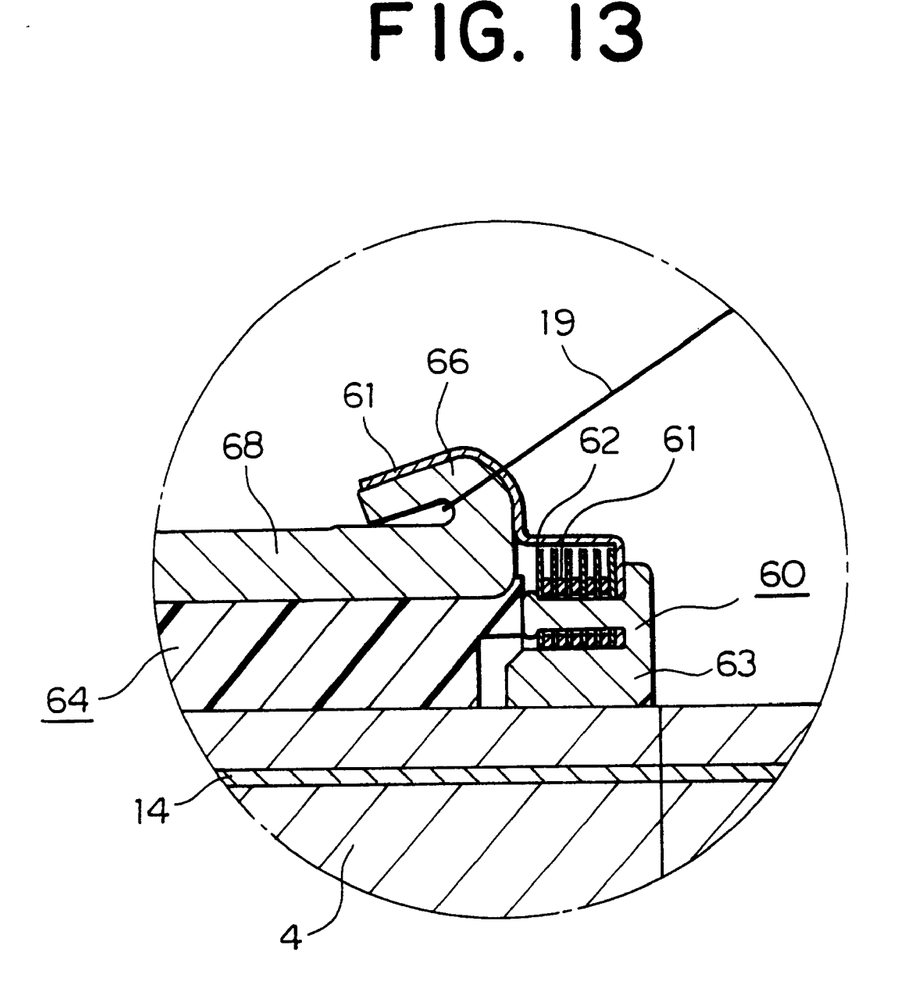
FIG. 13 is a partial enlargement of FIG. 12.

Furthermore, FIGS. 12 and 13 show an equalizer main body 60 composed of six terminals 61 and six insulating plates 62 stacked alternately on a base 63.

Figure 14:
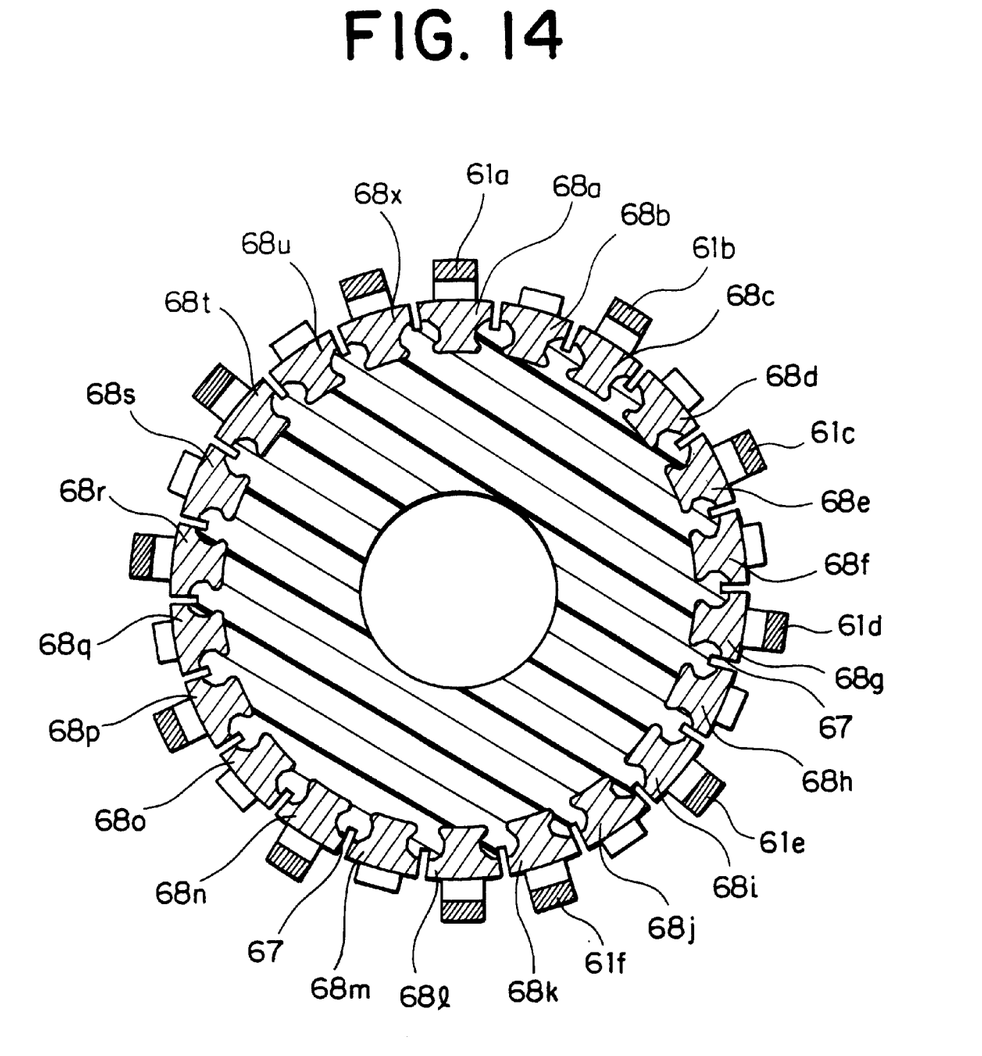
FIG. 14 is a front cross-section of the commutator in FIG. 12.

In this embodiment, when there are four poles and the number Ns of slots 11 in the core 9 is twenty-two, the terminals 61 of the equalizer main body 60 are electrically connected by fusion to segments 68 of a commutator 64 with generally even pitch, as shown in FIG. 14. That is to say, the first segment 68a and the twelfth segment 68l are electrically connected by the first terminal 61a which is the same shape as the terminals 24 shown in Embodiment 1. Similarly, the third segment 68c and the fourteenth segment 68n are electrically connected by the second terminal 61b. Furthermore, the fifth segment 68e and the sixteenth segment 68p are electrically connected by the third terminal 61c. The seventh segment 68g and the eighteenth segment 68r are electrically connected by the fourth terminal 61d. The ninth segment 68i and the twentieth segment 68t are electrically connected by the fifth terminal 61e. The eleventh segment 68k and the twenty-second segment 68x are electrically connected by the sixth terminal 61f.

It is normally desirable for the number of terminals 61 to be sufficient to cover all of the connections between segments 68 which are to have the same electric potential, but in this embodiment portions thereof have been omitted, as shown in FIG. 14. That is to say, the segments are not electrically connected by terminals between the second segment 68b and the thirteenth segment 68m, between the fourth segment 68d and the fifteenth segment 68o, between the sixth segment 68f and the seventeenth segment 68q, between the eighth segment 68h and the nineteenth segment 68s; or between the tenth segment 68j and the twenty-first segment 68u.

Figure 15:
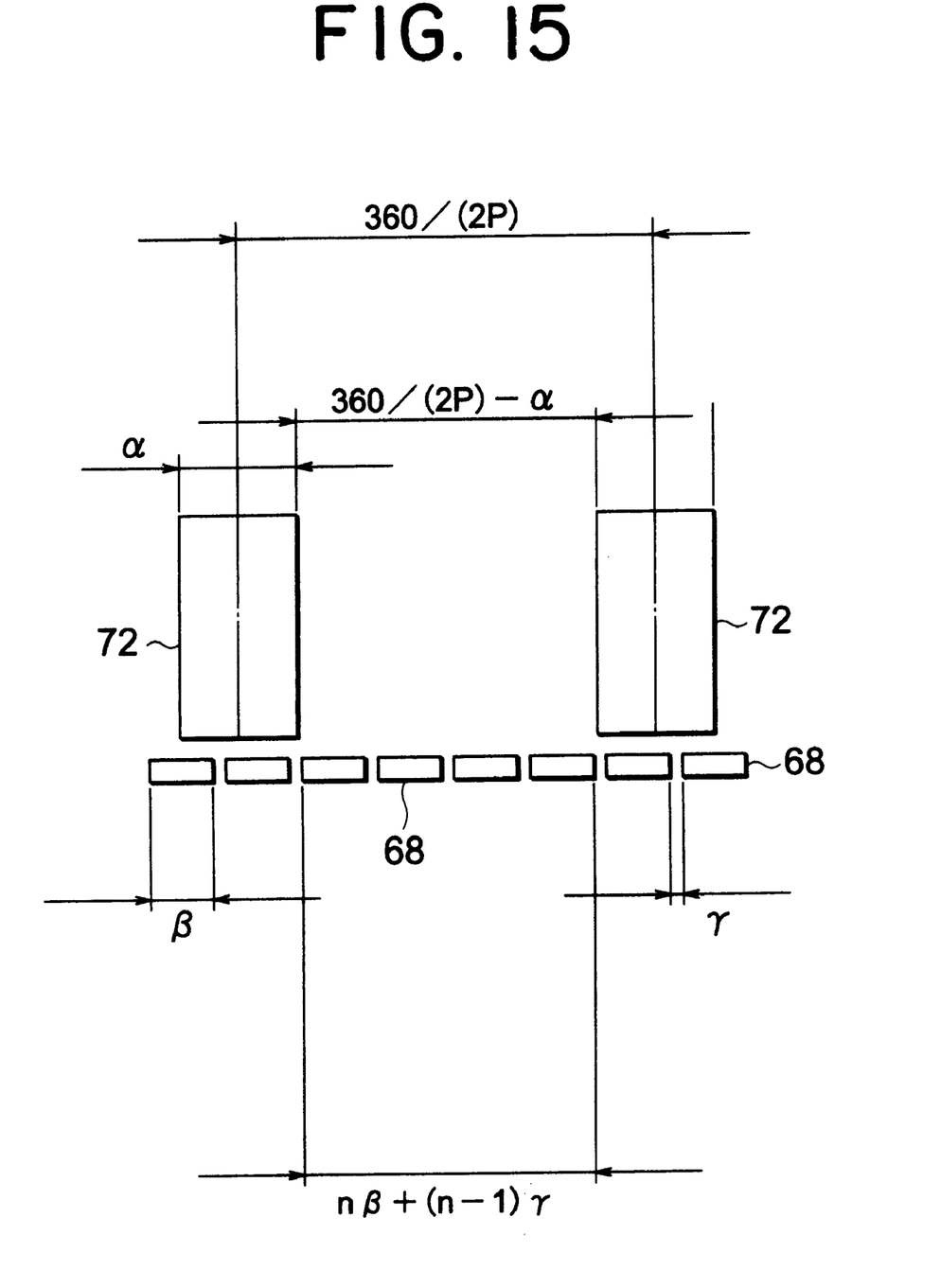
FIG. 15 is a diagram explaining how to find the minimum number of terminals required.

FIG. 15 is a diagram explaining how to find the minimum number of terminals 61 required, and is a flattened development of the contact surface between the brushes 72 and the segments 68.

In the diagram, when P is the number of magnetic poles, Ns is the number of slots, α a is the brush angle at the contact surface with the segments 68, β is the angle covered by each segment 68, and γ is the angle of the space between segments 68, a natural number n satisfying the expression $$(n\beta+(n-1)\gamma) \leq ((360/2P)-\alpha) \quad (1),$$

represents the maximum number of segments 68 which can be present between brushes 72. If the number K of terminals 61 relative to n is a whole number satisfying Expression (2) below, then at least one of the segments 68 present between the brushes 8 will be connected by a terminal 61.

$$(Ns/(n \times P)) \leq K \leq (Ns/P) \quad (2)$$

By determining the optimum number of terminals 61 in this manner, the longitudinal dimension of the equalizer main body 60 can be shortened, enabling the overall dimensions of the commutator motor to be reduced. Furthermore, the number of terminals 61 and insulating plates 62 constituting the equalizer main body 60 can also be reduced, enabling reductions in manufacturing costs.

Moreover, the upper limit of the number of terminals is generally taken to be Ns/P, but pairs of equipotential segments may also be connected by a plurality of equalizers. In such cases, the amount of current flowing through each of the equalizers can be reduced.

Furthermore, the equalizer main body 60 is disposed between the armature 20 and the commutator 64, but an equalizer main body may also be used in addition thereto in the vicinity of the armature 20 at the opposite end from the commutator 64.

Moreover, permanent field magnets composed of ferrite are used in each of the commutator motors in the above embodiments. When field winding methods are used, heat is released from the windings, but that does not occur when permanent field magnets are used. Furthermore, by using permanent field magnets, it is possible to reduce the size of the commutator motor, improve the assembly operation, and reduce costs.

Furthermore, because enamel-coated copper round wire is used as the wire 19 in the windings 21 in each of the commutator motors in the above embodiments, machine winding is possible. For that reason, the windings 21 can be formed by machine winding, but in machine winding, it is not possible to wind in perfect rows and there is a risk that irregularities in resistance and inductance between each of the circuits of the windings will increase. However, in the above embodiments, by providing terminals which are equalizing members, circulating currents are prevented from flowing in the brushes 72 due to differences in the induced voltages arising between each of the circuits, thereby eliminating problems arising due to irregularities in resistance and inductance between each of the circuits of the windings As explained above, a commutator motor according to one aspect of the present invention comprises: a yoke; a magnetic field portion secured to the inner wall of said yoke; a shaft disposed within said yoke so as to be able to rotate freely; an armature secured to the shaft having windings constructed by winding wire by a lap-winding method into slots formed on the outer circumferential surface of a core so as to extend longitudinally; a commutator secured to the shaft including a hollow cylindrical insulating resin portion and a plurality of segments held on an outer circumferential portion of the insulating resin portion with spaces between adjacent segments being held by the insulating resin portion; a plurality of brushes contacting the surface of the commutator; and a equalizing member electrically connecting segments which are to have the same electric potential. Therefore, problems such as radial vibration arising in the armature can be prevented even if cutting precision is poor and deviations in commutation timing occur as a result of poor precision in the dimensions of the spaces between the segments. Furthermore, the precision of the positioning of the brushes relative to the circumference of the commutator no longer has to be strict, enabling the clearance between the brushes and the brush holders to be that much freer, thereby enabling the force pressing the brushes against the segments to be reduced and also enabling torque loss to be reduced. Furthermore, the spaces between the segments are ensured by the insulating resin portion and insulating mica is no longer necessary, enabling the number of parts to be reduced accordingly and thereby making it possible to reduce the size of the motor.

According to one form of the commutator motor, the wire may be enamel-coated round wire. Therefore, the process-of winding the windings onto the core is facilitated by mechanization, enabling mass-production of the armature and thereby reducing manufacturing costs.

According to another form of the commutator motor, the magnetic field portion may comprise a plurality of permanent magnets disposed so as to be spaced around said inner wall of said yoke. Therefore, heat is not released from the field portion, the motor is thermally advantageous, and also enables reductions in size, improvements to the assembly operation, and reductions in cost.

According to still another form of the commutator motor, the number of the slots in the core may be an even number and may be not a multiple of the number of poles. Therefore, the magnetic attraction acting on the armature is zero, ensuring that operating noise due to such attraction does not occur, as well as enabling torque ripples to be reduced.

According to still another form of the commutator motor, the number of the equalizing member may be determined so as to satisfy a relational expression $Ns/(n \times P) \leq K \leq Ns/P$, where K is the number of said equalizing member, Ns is the number of the slots in the core, n is the maximum number of segments able to be present between the brushes, and P is the number of pairs of poles. Therefore, it is possible to reduce the number of equalizing members, enabling cost reductions, streamlining of the assembly process, and size reductions to be planned.

What is claimed is:

1. A commutator motor comprising:

a yoke;

a magnetic field portion secured to the inner wall of said yoke;

a shaft disposed within said yoke so as to be able to rotate freely;

an armature secured to said shaft having windings constructed by winding wire by a lap-winding method into slots formed on the outer circumferential surface of a core so as to extend longitudinally;

a commutator secured to said shaft including a hollow cylindrical insulating resin portion and a plurality of segments held on an outer circumferential portion of said insulating resin portion with spaces between adjacent segments being held by said insulating resin portion;

an equalizing member electrically connecting at least two of said plurality of segments which are to have the same electric potential.

2. The commutator motor according to claim 1 wherein said wire is enamel-coated round wire.

3. The commutator motor according to claim 1 wherein said magnetic field portion comprises a plurality of permanent magnets disposed so as to be spaced around said inner wall of said yoke.

4. The commutator motor according claim 1 wherein the number of said slots in said core is an even number and is not a multiple of the number of poles.

5. The commutator motor according to claim 1 wherein the number of said equalizing members is determined so as to satisfy a relational expression $Ns/(n \times P) \leq K \leq Ns/P$, where K is the number of said equalizing member, Ns is the number of said slots in said core, n is the maximum number of segments able to be present between said brushes, and P is the number of pairs of poles.

* * * * *